US012452622B2

(12) United States Patent
Rasp et al.

(10) Patent No.: US 12,452,622 B2
(45) Date of Patent: Oct. 21, 2025

(54) SPATIAL ALIASING REDUCTION FOR MULTI-SPEAKER CHANNELS

(71) Applicant: Google LLC, Mountain View, CA (US)

(72) Inventors: Olen Rasp, Mountain View, CA (US); Pei Chen Chuang, Mountain View, CA (US); Gabriel Slotnick, Mountain View, CA (US)

(73) Assignee: Google LLC, Mountain View, CA (US)

( * ) Notice: Subject to any disclaimer, the term of this patent is extended or adjusted under 35 U.S.C. 154(b) by 230 days.

(21) Appl. No.: 18/367,105

(22) Filed: Sep. 12, 2023

(65) Prior Publication Data

US 2024/0089684 A1 Mar. 14, 2024

Related U.S. Application Data

(60) Provisional application No. 63/406,013, filed on Sep. 13, 2022.

(51) Int. Cl.
*H04S 7/00* (2006.01)

(52) U.S. Cl.
CPC .......... *H04S 7/301* (2013.01); *H04S 2400/09* (2013.01)

(58) Field of Classification Search
CPC .......... H04R 2203/12; H04R 2205/021; H04R 2460/07; H04R 2499/11; H04R 2499/15; H04R 5/02; H04R 5/04; H04S 2400/09; H04S 7/302
See application file for complete search history.

(56) References Cited

U.S. PATENT DOCUMENTS

| | | | |
|---|---|---|---|
| 2015/0023533 A1 | 1/2015 | Johnson et al. | |
| 2016/0173667 A1 | 6/2016 | Torres Gutierrez et al. | |
| 2017/0265017 A1* | 9/2017 | Katayama | H04R 5/02 |
| 2018/0249278 A1 | 8/2018 | Mihelich et al. | |

* cited by examiner

*Primary Examiner* — Kile O Blair
(74) *Attorney, Agent, or Firm* — Kilpatrick Townsend & Stockton LLP

(57) ABSTRACT

Various arrangements for reducing auditory spatial aliasing for a user are detailed herein. A first delay filter may be set that delays output of a first same audio signal by a first duration to a speaker of a first set of multiple speakers of a device compared to a second speaker of the first set of multiple speakers. A second delay filter may also be set that delays output of a second same audio signal by a second duration to a speaker of a second set of multiple speakers of the device compared to a second speaker of the second set of multiple speakers. The first same audio signal can be output using the first set of multiple speakers and the second same audio signal can be output using the second set of multiple speakers.

20 Claims, 6 Drawing Sheets

SPATIAL ALIASING REDUCTION FOR MULTI-SPEAKER CHANNELS

CROSS-REFERENCE TO RELATED APPLICATION

This application claims the benefit of and priority to U.S. Provisional Application No. 63/406,013, filed on Sep. 13, 2022, and titled "SPATIAL ALIASING REDUCTION FOR MULTI-SPEAKER CHANNELS," the content of which is herein incorporated by reference in its entirety for all purposes.

BACKGROUND

When multiple speakers output the same sound but the path length to the listener's ear differs for each speaker, auditory spatial aliasing can occur. Due to the difference in path length, depending on the frequency of sound, constructive or destructive interference occurs at various frequencies. This phenomenon can cause audio to sound distorted to the listener. As the path lengths change, such as due to movement of the listener or the device outputting audio, the listener may be made acutely aware of the distortion as the frequencies at which constructive and destructive interference occur shift.

SUMMARY

Various embodiments are described related to a tablet system for reducing auditory spatial aliasing. In some embodiments, a tablet system for reducing auditory spatial aliasing is described. The system may comprise a tablet computer comprising a first plurality of magnets. The system may comprise a dock that removably attaches with the tablet computer using a second plurality of magnets that magnetically couple with the first plurality of magnets. The tablet computer may comprise a first set of multiple speakers in communication with a first audio source. The first audio source may output a same first audio signal to each speaker of the first set of multiple speakers. The tablet computer may comprise a second set of multiple speakers in communication with a second audio source. The second audio source may output a same second audio signal to each speaker of the second set of multiple speakers. The tablet computer may comprise the first audio source, comprising a first delay filter that delays output of the first same audio signal by a first duration to a speaker of the first set of multiple speakers compared to a second speaker of the first set of multiple speakers. The tablet computer may comprise the second audio source, comprising a second delay filter that delays output of the second same audio signal by a second duration to a speaker of the second set of multiple speakers compared to a second speaker of the second set of multiple speakers.

Embodiments of such a system may include one or more of the following features: an anti-aliasing profile datastore. The anti-aliasing profile datastore may store a plurality of anti-aliasing profiles that are each used to reduce auditory spatial aliasing by adjust the first duration and the second duration based on a state of the tablet computer. At least one anti-aliasing profile of the plurality of anti-aliasing profiles may set the first duration and the second duration to decrease aliasing caused by reflections from a surface while the tablet computer may be magnetically attached with the tablet computer. The plurality of anti-aliasing profiles may further comprise a first anti-aliasing profile for when the tablet computer is being held. The plurality of anti-aliasing profiles may further comprise a second anti-aliasing profile for when the tablet computer is lying flat. The tablet computer may further comprise an inertial measurement unit (IMU). The speakers that output audio from the first audio source and the second audio source may vary based on an orientation determined based on a measurement by the IMU.

In some embodiments, a system for reducing auditory spatial aliasing is described. The system may comprise a first set of multiple speakers in communication with a first audio source. The first audio source may output a same first audio signal to each speaker of the first set of multiple speakers. The system may comprise a second set of multiple speakers in communication with a second audio source. The second audio source may output a same second audio signal to each speaker of the second set of multiple speakers. The system may comprise the first audio source, comprising a first delay filter that delays output of the first same audio signal by a first duration to a speaker of the first set of multiple speakers compared to a second speaker of the first set of multiple speakers. The system may comprise the second audio source, comprising a second delay filter that delays output of the second same audio signal by a second duration to a speaker of the second set of multiple speakers compared to a second speaker of the second set of multiple speakers.

Embodiments of such a system may include one or more of the following: an anti-aliasing profile datastore. The anti-aliasing profile datastore may store a plurality of anti-aliasing profiles that are each used to reduce auditory spatial aliasing by adjust the first duration and the second duration based on a state of the system. The first set of multiple speakers, the second set of multiple speakers, the first audio source, and the second audio source may be part of a tablet computer. The system may further comprise a dock to which the tablet computer is removably attached. The tablet computer may attach with the dock at a fixed angle and a fixed height with respect to a surface on which the dock is located. At least one anti-aliasing profile of the plurality of anti-aliasing profiles may set the first duration and the second duration to decrease aliasing caused by reflections from the surface. The plurality of anti-aliasing profiles may comprise a first anti-aliasing profile for when the tablet computer is docked with the dock. The plurality of anti-aliasing profiles may comprise a second anti-aliasing profile for when the tablet computer is being held. The plurality of anti-aliasing profiles may comprise a third anti-aliasing profile for when the tablet computer is lying flat. The system may further comprise an inertial measurement unit (IMU). The speakers that output audio from the first audio source and the second audio source may vary based on an orientation determined using a measurement made by the IMU. The first audio source may comprise a first digital signal processor (DSP) and the second audio source may comprise a second DSP. The system may be incorporated as part of a tablet display that is permanently attached with a stand configured to stand on a surface.

In some embodiments, a method for reducing auditory spatial aliasing is described. The method may set a first delay filter that delays output of a first same audio signal by a first duration to a speaker of a first set of multiple speakers of a device compared to a second speaker of the first set of multiple speakers. The method may set a second delay filter that delays output of a second same audio signal by a second duration to a speaker of a second set of multiple speakers of the device compared to a second speaker of the second set of multiple speakers. The first delay filter and the second delay filter being set may decrease auditory spatial aliasing for a user. The method may output the first same audio signal using the first set of multiple speakers and the second same audio signal using the second set of multiple speakers.

Embodiments of such a method may include one or more of the following: determining an orientation of the device using a measurement from an inertial measurement unit (IMU) of the device. The method may comprise assigning an anti-aliasing profile from a plurality of anti-aliasing profiles based at least in part of the orientation of the device. The anti-aliasing profile may define the first duration and the second duration. The method may comprise detecting a state change of the device. The method may comprise in response to the state change, selecting a different anti-aliasing profile from the plurality of anti-aliasing profiles. The state change may comprise the device being removed from a dock. The anti-aliasing profile may decrease auditory aliasing caused by reflection of audio by a surface on which the dock is located.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In various forms of devices, multiple speakers may output the same audio. A stereo channel that is created by a digital signal processor (DSP) may be output to multiple speakers. As an example, the left stereo channel of a device may be output via two or more speakers. Similarly, multiple speakers may be used for the right stereo channel.

Figure 1:
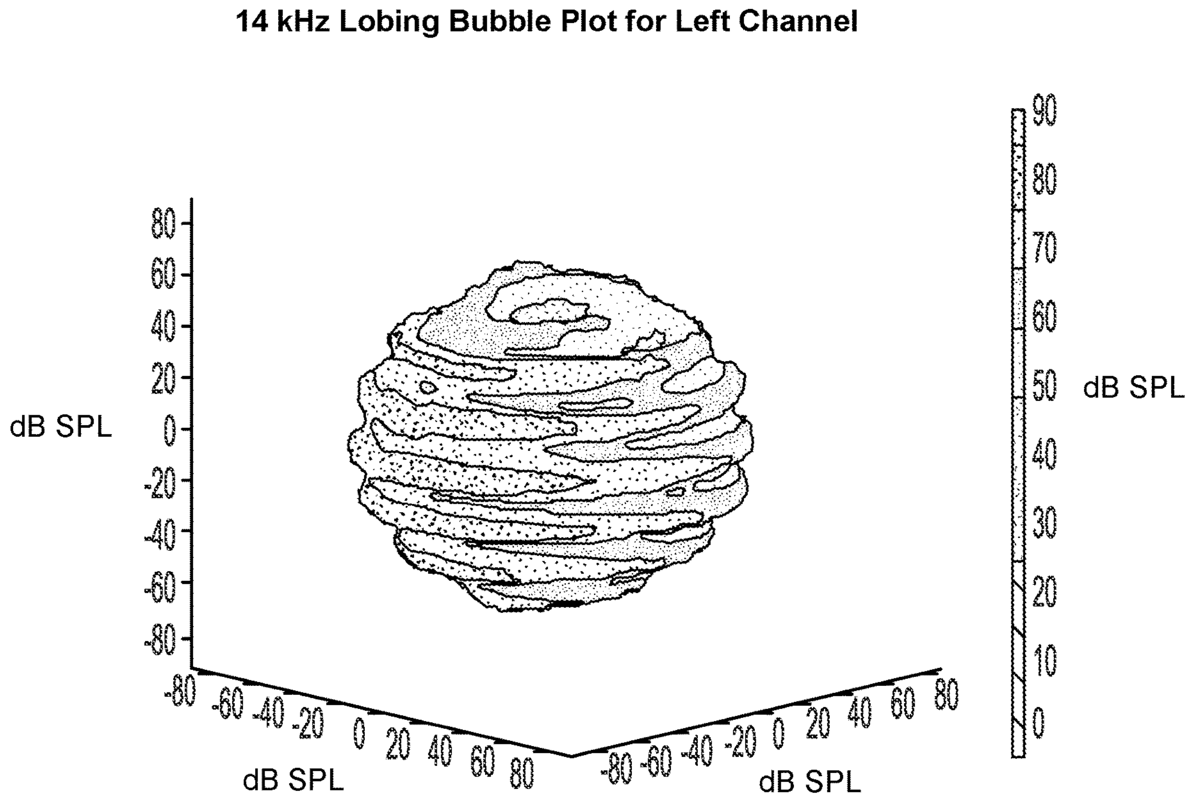
FIG. 1 illustrates an embodiment of spatial aliasing that occurs at a particular frequency.

If no remediation is performed, due to a difference in path length, depending on the frequency of sound, constructive or destructive interference occurs at various frequencies within a given stereo channel. This phenomenon can cause audio to sound distorted to the listener. As an example, FIG. 1 illustrates an embodiment of spatial aliasing that occurs at a particular frequency. The illustrated graph shows the effect on the magnitude of a tone at 14 kHz in three-dimensional space when the tone is output by two speakers located a fixed distance from each other. Depending on a location relative to the speakers, either constructive interference or destructive interference occurs, thus causing the tone to sound louder or quieter, respectively, to a listener. In embodiments detailed herein, a determination of where a listener is generally located in relation to the speakers is performed. Based on this generalized location, a delay can be applied to the audio signal as output to a speaker within a channel to reduce or eliminate such aliasing.

Figure 2:
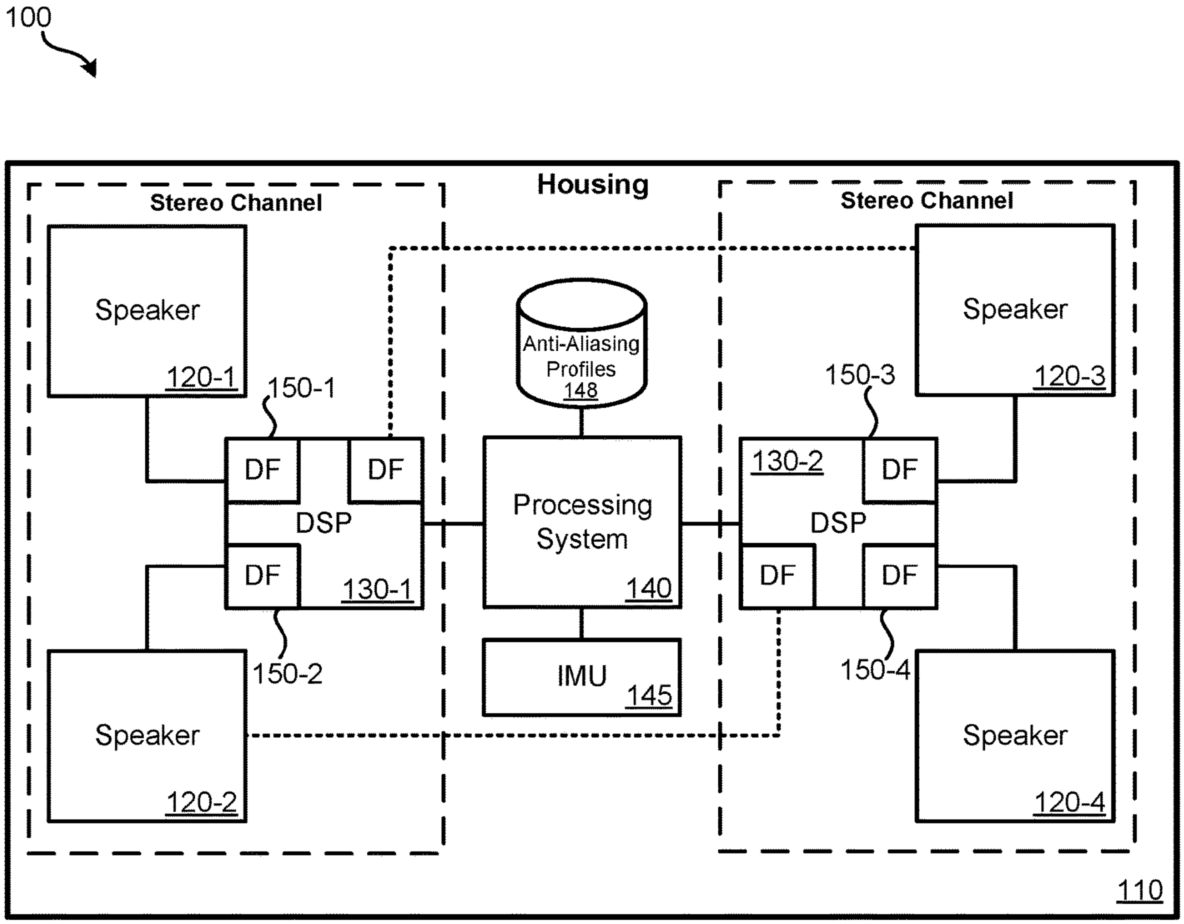
FIG. 2 illustrates an embodiment of a system for performing spatial aliasing reduction for multi-speaker channels.

FIG. 2 illustrates an embodiment of a system 100 for performing spatial aliasing reduction for multi-speaker channels. System 100 can include: housing 110; speakers 120; digital signal processors 130 ("DSPs 130"); processing system 140; inertial measurement unit 145 ("IMU 145"); and anti-aliasing profiles 148.

Figure 3:
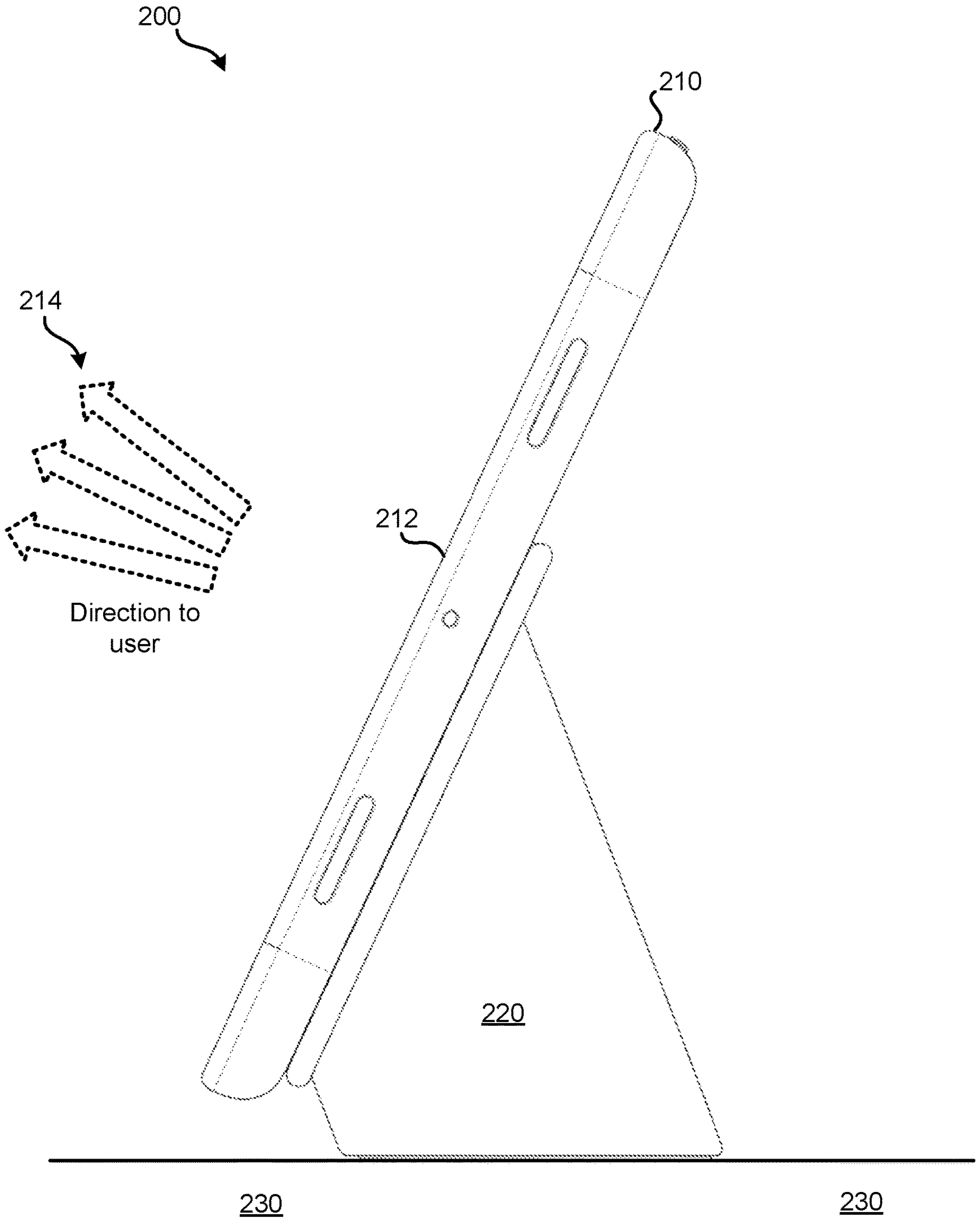
FIG. 3 illustrates an embodiment of a tablet computer that is removably attached with a dock.

In general, system 100 can be incorporated as part of some other device. For example, system 100 can be part of a tablet computer or home assistant device. In some embodiments, a home assistant device includes a stand or base and a removable tablet computer portion. An example of such an arrangement is shown in FIG. 3. The tablet computer portion can serve as an interface to control home automation components within a home and can also be used as a general-purpose computing device. In other embodiments, system 100 can be incorporated as part of some other form of device, such as a: gaming device, smartphone, laptop computer, streaming device, television, computer display, or some other form of electronic device that includes multiple speakers being used for a given audio channel.

System 100 includes speakers 120 that are arranged within housing 110. Speakers 120 include multiple speakers per audio channel. As illustrated, there are stereo audio channels, but more than two may be present in other embodiments. For each stereo channel in FIG. 1, two speakers are present. Speaker 120-1 and speaker 120-2 are present in a first stereo channel and speaker 120-3 and speaker 120-4 are present in a second stereo channel. The speakers may be physically distributed within housing 110. For example, while FIG. 1 is a block diagram, the locations of speakers 120 in FIG. 1 may be roughly indicative of their physical location—toward each corner of housing 110.

DSP 130-1 can have an amplifier on-board or in combination with an amplifier and output an audio signal to speaker 120-1 and speaker 120-2. Therefore, for speakers 120-1 and 120-2, DSP 130-1 serves as the audio source. The same audio signal can be output to each of speakers 120-1 and 120-2. However, a delay filter (DF) can be applied at DSP 130-1 to alter the timing of when the audio signal is output at either speaker 120-1 or speaker 120-2. A DF can be implemented via a specialized component or can be implemented on-board DSP 130-1. As illustrated, DF 150-1 and DF 150-2 are implemented on-board DSP 130-1. DFs 150-1 and 150-2 may delay the entirety of the audio signal (irrespective of frequency) by a fixed amount of time or may apply a different amount of delay depending on the frequency. DFs 150 can be implemented using a digitally implemented finite impulse response (FIR) filter. For a digital FIR filter, the filter can be implemented with some number of taps, such as 230. Each tap is mapped to an associated amount of time delay based on the sampling frequency. A particular tap can be activated based on the amount of delay desired. Other forms of digital or analog filters to implement a delay in the time domain are also possible. Different taps can be activated by either adjusting a setting of the DSP or by loading different software or firmware onto the DSP.

At a given time for DSP 130-1, only one of DFs 150-1 and 150-2 may be active. Therefore, no delay may be applied to the audio signal as output to one of speakers 120-1 and 120-2, while delay is applied to the same audio signal as output to the other speaker of speakers 120-1 and 120-2.

The other stereo channel that includes speakers 120-3 and 120-4 and DSP 130-2 functions similarly: The same audio signal can be output to each of speakers 120-3 and 120-4. Therefore, for speakers 120-3 and 120-4, DSP 130-2 serves as the audio source. However, a DF can be applied at DSP 130-2 to alter the timing of when the audio signal is output at either speaker 120-3 or speaker 120-4. As illustrated, DF 150-3 and DF 150-4 are implemented on-board DSP 130-2. DFs 150-3 and 150-4 may delay the entirety of the audio signal (irrespective of frequency) by a fixed amount of time or may apply a different amount of delay depending on the frequency.

Processing system 140 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD).

Processing system 140 communicates with DSPs 130 and configures DSPs 130 with the appropriate amount of delay for the appropriate speakers. Processing system 140 may select a particular anti-aliasing profile from a data storage arrangement that stores anti-aliasing profiles 148. Different anti-aliasing profiles may be stored for different situations, with different anti-aliasing profiles being designed to reduce auditory aliasing at various frequencies (e.g., by increasing or decreasing audio at such frequencies) in different situations. For example, if system 100 is incorporated in a tablet computer that is removable from a stand or base, anti-aliasing profiles 148 may include at least: a first profile for when the tablet is attached with the stand, a second profile for when the tablet is being held, and a third profile for when the tablet is removed from the stand and is lying on a flat surface. Each of these anti-aliasing profiles may result in different amounts of delay being applied to a particular speaker within a particular stereo channel. For example, for the first channel, based on where a listener's ears are typically located relative to the speakers, it may be known that the audio path from speaker 120-2 and speaker 120-4 to the listener's ears is longer than the audio path from speaker 120-1 and speaker 120-3 to the listener's ears. Therefore, an amount of delay may be applied to the audio signal as output to speaker 120-1 and speaker 120-3.

To create an anti-aliasing profile for a particular situation, initially the delays and filters are calculated and simulated, which can include using some underlying assumptions to bound the problem like typical surface size and distances. Once the initial filters are implemented, testing and validation is performed, along with physical and acoustical measurements, on a mock-up or fully functioning system. As needed, the filters and/or parameters can be adjusted following test, such as to accommodate factors such as diffraction of the device and room boundaries in various environments. A variety of acoustic environments can be used such as a neutral acoustic room or anechoic chamber (~100% absorptive), home environments and small, and/or highly reflective environments like an all glass conference room. A spatial average acoustical measurement within the region of interest (e.g., cone in which the user may be located) to measure performance in each of these environments.

The correct anti-aliasing profile may be selected by processing system 140 using various factors, which can include measurements from IMU 145, user input, stand detection, and/or other sources. IMU 145, which can include one or more accelerometers and gyroscopes, may be used to determine an orientation of system 100 with respect to gravity. Such measurements can also be used to detect motion, which can be indicative of system 100 being handheld. If IMU 145 detects a particular fixed orientation with respect to gravity, this may be indicative of system 100 being attached with a stand or system 100 having been placed flat on a surface (e.g., countertop, table).

For some forms of devices, such as tablet computers and smartphones, the device can be used (e.g., held or placed on a stand) in either a portrait or landscape orientation. Depending on the orientation detected by processing system 140 via IMU 145 (or via some other form of sensor or user input), which speakers that are used to output audio from which DSP may be altered. For example, if housing 110 is rotated 90° counterclockwise, speakers 120-1 and 120-3 may be used as part of the same stereo channel (e.g., the left stereo channel). Likewise, speakers 120-2 and 120-4 may be used as part of the other stereo channel (e.g., the right stereo channel). Therefore, DSP 130-1 may output the same audio signal to speakers 120-1 and 120-3 (with a delay applied to the audio signal output to one of the speakers) and DSP 130-2 may output a same audio signal to speakers 120-2 and 120-4 (again, with a delay applied to one of the speakers).

FIG. 3 illustrates an embodiment 300 of a tablet computer that is removably attached with a dock. Tablet computer 210 ("tablet 210") can attach, such as via multiple magnets within tablet 210 and dock 220, to dock 220. Dock 220 may hold tablet 210 at an angle relative to and/or a distance above surface 230. A user may tend to view and interact with tablet 210 at a distance from a display 212, as indicated by arrows 214. In alternative embodiments, tablet 210 may be permanently attached with dock 220 (in such arrangements dock 220 can be referred to as a base).

Figure 4:
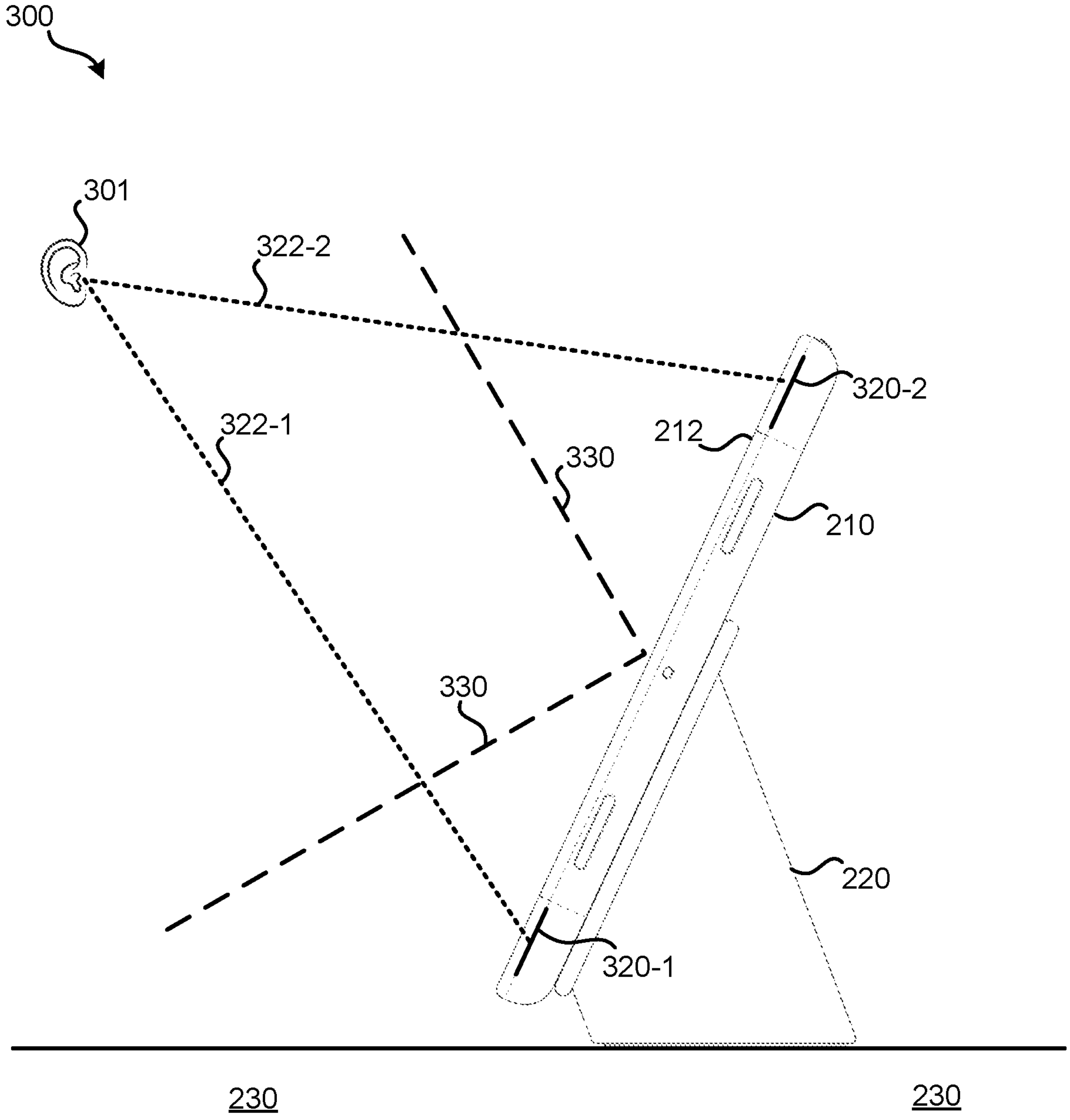
FIG. 4 illustrates an embodiment of different audio path lengths for an audio channel.

FIG. 4 illustrates an embodiment 300 of different audio path lengths for an audio channel. Embodiment 300 illustrates a tablet computer 210, which includes system 100, docked with dock 220 as illustrated in FIG. 3. As visible from the right side in FIG. 2, two speakers, speakers 320 (320-1, 320-2), are shown. Speakers 320 output a same audio stream from a DSP and therefore output a single (right) stereo channel. If viewed from the opposite side, two other speakers that output the other stereo channel (left) would be present.

When a listener 301 (represented by an ear) is listening to audio from speakers 320, the listener may typically be within region 330, which in three dimensions can be represented as a cone. Spatial aliasing may be reduced or minimized within region 330, such as for listener 301. Audio path length 322-1 is longer than path length 322-2. Therefore, if no remediation is taken, at some frequencies, constructive and destructive interference will occur, which can result in listener 301 hearing auditory distortion. To account for the difference in path length, a fixed delay may be applied to the audio stream output from speaker 320-2. Therefore, while the audio stream may be unchanged, a delay can be applied to account for the difference in path length within region 330 to eliminate or at least reduce the amount of constructive and destructive auditory interference.

Figure 5:
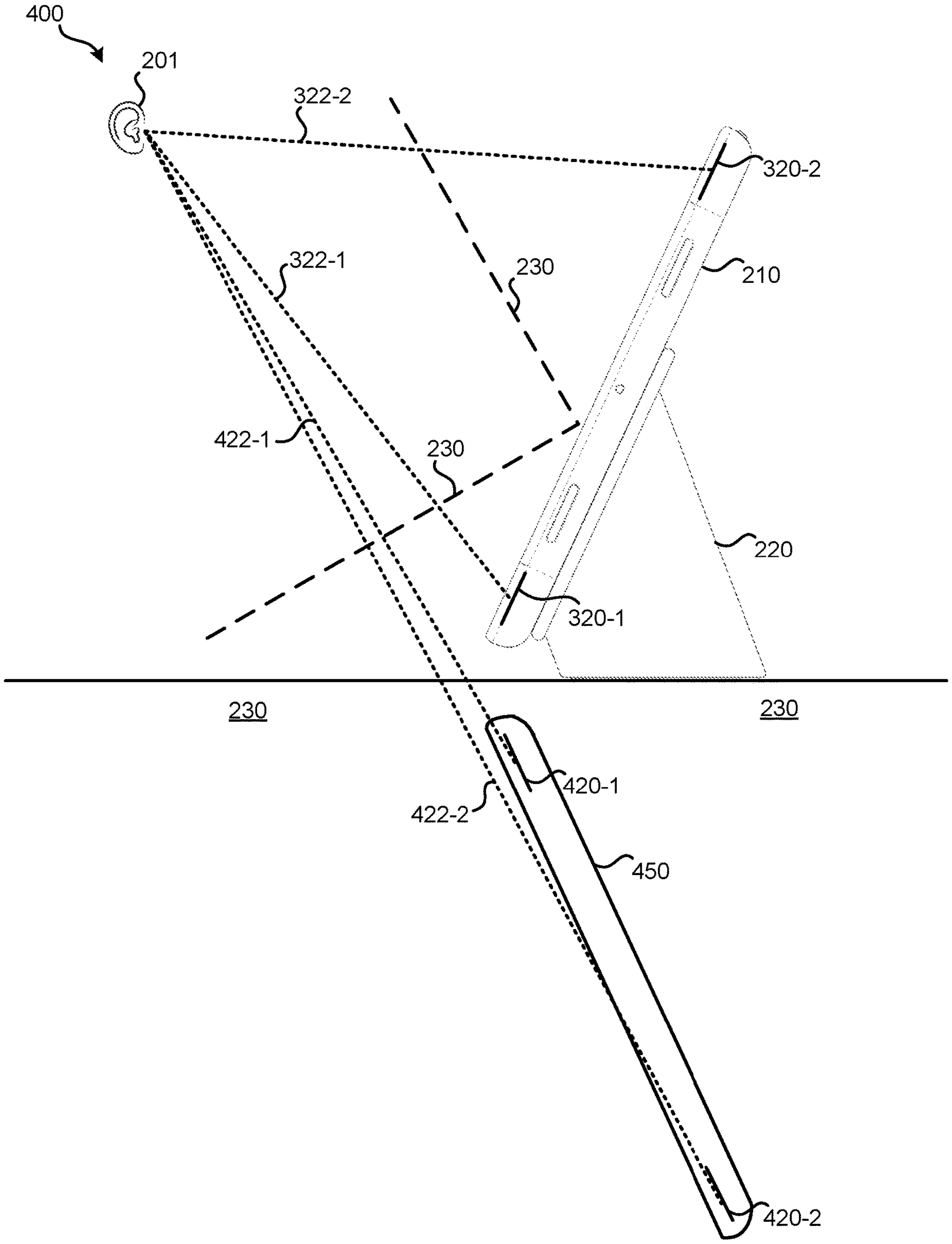
FIG. 5 illustrates an embodiment of different audio path lengths for an audio channel in which reflection from a surface occurs.

FIG. 5 illustrates an embodiment 400 of different audio path lengths for an audio channel in which reflection occurs. Similar to FIG. 4, embodiment 400 illustrates tablet computer 210, which includes system 100, attached (either removably or permanently) with dock 220. As visible from the right side in FIG. 4, two speakers, speakers 320, are shown. Speakers 320 output a same audio stream from a DSP and therefore output a single (e.g., right) stereo channel. If viewed from the opposite side, two other speakers that output the other stereo channel (e.g., left) would be present. In contrast to FIG. 4, FIG. 5 additionally shows an effect of sound reflecting off of surface 230. To represent the reflect from surface 230, a reflection of tablet 210 is shown as reflection tablet 450 along with audio reflection sources 420.

Due to reflections off surface 230, two additional path lengths can be factored in when adjusting delay of one of speakers 320. Reflection sources 420 (420-1, 420-2) are due to audio emitted from speakers 320 reflecting off surface 230. The delay applied to one of speakers 320 can factor in eliminating or at least decreasing the aliasing caused by audio reflections from surface 230 along paths 422-1 and/or 422-2.

For embodiments 300 and 400, the angle of tablet computer 210 with respect to surface 230 and distance of speakers 320 from surface 230 are known due to dock 220 being provided by the same vendor or manufacturer as tablet 210. Alternatively, if a dock from another source is used, height and angle information may be otherwise obtained, such as by user input or as part of a setup process of the dock. A particular anti-aliasing profile may be applied from anti-aliasing profiles 148 to apply delay to a speaker of a stereo channel to reduce the aliasing effect. In embodiments involving tablet computer 210 being in a different position relative to a listener, a different profile may be applied. Such profiles can be tuned for various situations including: tablet computer 210 being held; tablet computer 210 being placed flat on a flat surface (e.g., surface 230); tablet computer 210 being placed on a non-flat surface (e.g., a couch), etc.

Figure 6:
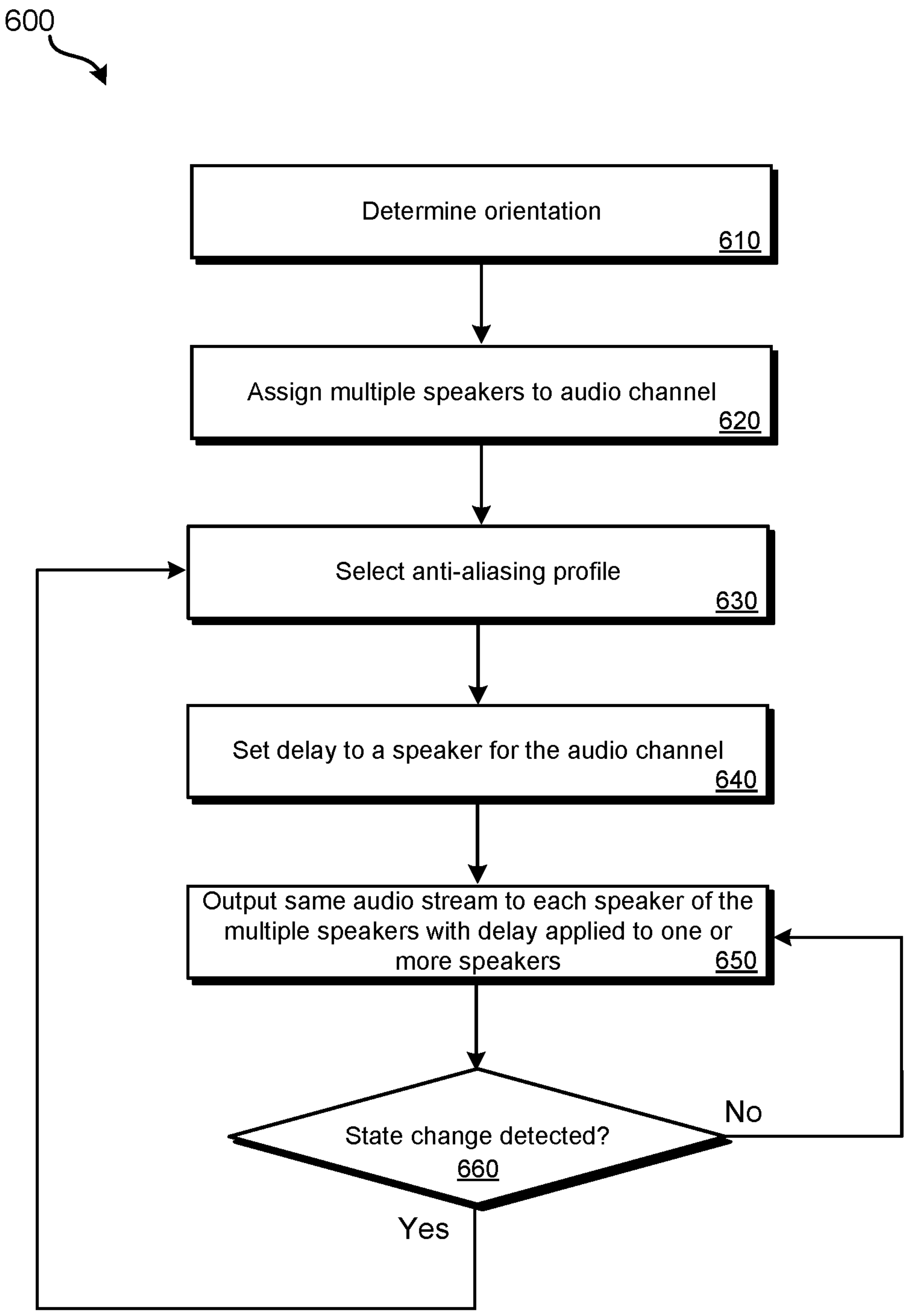
FIG. 6 illustrates an embodiment of a method for performing spatial aliasing reduction for multi-speaker channels.

Various methods can be performed using system 100 of FIG. 2 to reduce auditory aliasing. These methods may or may not account for reflections off of a surface, such as illustrated in FIG. 5. For example, reflections may only be considered if the device is expected to be positioned relative to a reflective (e.g., hard) surface. More specifically, reflections may only be accounted for when the device is connected with a charger, base, or stand (e.g., when tablet 210 is attached with dock 220). FIG. 6 illustrates an embodiment of method 600 for performing spatial aliasing reduction for multi-speaker channels. Method 600 can be performed by a device that has system 100 incorporated. For example, the device can be: a tablet computer, a tablet computer that is part of a smart home hub or assistant device, a smartphone, a gaming device, a smart television, a laptop computer, a monitor having built in speakers, or some other computerized device that uses multiple on-board speakers per audio channel.

At block 610, an orientation of the device having multiple speakers per channel may be determined, such as based on an IMU measurement. The orientation may be portrait or landscape. In some embodiments, block 610 is not necessary, such as if a particular orientation is expected to always be used (e.g., a device that is only configured to function in landscape orientation or portrait orientation.

At block 620, based on the determined orientation, multiple speakers are assigned to output a particular audio channel. For example, at least two speakers are assigned to a left stereo channel and at least two speakers are assigned to a right stereo channel. The assignment of block 620 is not necessary if speakers are already permanently assigned to output a particular audio channel, such as if the device is configured to function only in a particular orientation.

At block 630, an anti-aliasing profile is selected based on various factors, which can include: orientation with respect to gravity; whether the device is likely being held; whether the device is docked with a stand or base; based on explicit user (e.g., listener) input (e.g., user selects the mode); being based on a camera or radar sensor, either on-board or on another device, observing the position of the device, etc. Each anti-aliasing profile can account for one or more listeners being expected to be in a region relative to the speakers of the device, such as region 330. While some profiles may account for reflections (e.g., as illustrated in relation to FIG. 5), other profiles may not (e.g., a profile for when the device is handheld).

At block 640, a delay is set for at least one speaker in each audio channel. The delay is selected to help minimize or at least decrease the effect of aliasing within region 330. If each channel is to be output by two speakers, a delay may be set for one of the speakers that outputs the audio channel. If a channel is to be output by three or more speakers, delays may be set for two of the speakers. The delay may be set by configuring a filter (e.g., digital FIR filter) implemented by the DSP that outputs the audio stream to each speaker assigned to a given audio channel. In some embodiments, non-zero delays can be set for each speaker that outputs a given audio channel, with the difference between the delays serving to decrease the amount of aliasing.

At block 650, the same audio stream is output to each speaker for a given audio channel, but the delay based on the selected anti-aliasing profile is applied to the audio stream as output to at least one speaker in the audio channel to reduce audio aliasing as experienced by a listener within a defined region (e.g., cone) within which the listener is expected to be located.

Block 650 may continue being performed until a change in the state of the device is detected at block 660. The state change can be a change in orientation or another form of event that could Affect which anti-aliasing profile is applied, such as removal from dock 220 or IMU data indicating the device is being held. Following a state change being detected at block 660, method 600 can return to block 630, at which a different anti-aliasing profile may be selected (which in some embodiments includes the option of no profile being selected), with blocks 640 and 650 then being repeated for the now-selected anti-aliasing profile.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A tablet system for reducing auditory spatial aliasing, the tablet system comprising:
- a tablet computer comprising a first plurality of magnets;
- a dock that removably attaches with the tablet computer using a second plurality of magnets that magnetically couple with the first plurality of magnets, wherein the tablet computer comprises:
  - a first set of multiple speakers in communication with a first audio source, wherein the first audio source outputs a same first audio signal to each speaker of the first set of multiple speakers;
  - a second set of multiple speakers in communication with a second audio source, wherein the second audio source outputs a same second audio signal to each speaker of the second set of multiple speakers;
  - the first audio source, comprising a first delay filter that delays output of the first same audio signal by a first duration to a speaker of the first set of multiple speakers compared to a second speaker of the first set of multiple speakers; and
  - the second audio source, comprising a second delay filter that delays output of the second same audio signal by a second duration to a speaker of the second set of multiple speakers compared to a second speaker of the second set of multiple speakers.

2. The tablet system of claim 1, wherein the tablet computer further comprises:
- an anti-aliasing profile datastore, wherein the anti-aliasing profile datastore stores a plurality of anti-aliasing profiles that are each used to reduce auditory spatial aliasing by adjusting the first duration and the second duration based on a state of the tablet computer.

3. The tablet system of claim 2, wherein at least one anti-aliasing profile of the plurality of anti-aliasing profiles sets the first duration and the second duration to decrease aliasing caused by reflections from a surface while the tablet computer is magnetically attached with the tablet computer.

4. The tablet system of claim 3, wherein the plurality of anti-aliasing profiles further comprises:
- a first anti-aliasing profile for when the tablet computer is being held; and
- a second anti-aliasing profile for when the tablet computer is lying flat.

5. The tablet system of claim 4, wherein the tablet computer further comprising an inertial measurement unit (IMU), wherein the speakers that output audio from the first audio source and the second audio source vary based on an orientation determined based on a measurement by the IMU.

6. A system for reducing auditory spatial aliasing, the system comprising:
- a first set of multiple speakers in communication with a first audio source, wherein the first audio source outputs a same first audio signal to each speaker of the first set of multiple speakers;
- a second set of multiple speakers in communication with a second audio source, wherein the second audio source outputs a same second audio signal to each speaker of the second set of multiple speakers;
- the first audio source, comprising a first delay filter that delays output of the first same audio signal by a first duration to a speaker of the first set of multiple speakers compared to a second speaker of the first set of multiple speakers; and
- the second audio source, comprising a second delay filter that delays output of the second same audio signal by a second duration to a speaker of the second set of multiple speakers compared to a second speaker of the second set of multiple speakers.

7. The system for reducing the auditory spatial aliasing of claim 6, further comprising:
- an anti-aliasing profile datastore, wherein the anti-aliasing profile datastore stores a plurality of anti-aliasing profiles that are each used to reduce auditory spatial aliasing by adjust the first duration and the second duration based on a state of the system.

8. The system for reducing the auditory spatial aliasing of claim 7, wherein the first set of multiple speakers, the second set of multiple speakers, the first audio source, and the second audio source are part of a tablet computer.

9. The system for reducing the auditory spatial aliasing of claim 8, the system further comprising a dock to which the tablet computer is removably attached, wherein the tablet computer attaches with the dock at a fixed angle and a fixed height with respect to a surface on which the dock is located.

10. The system for reducing the auditory spatial aliasing of claim 9, wherein at least one anti-aliasing profile of the plurality of anti-aliasing profiles sets the first duration and the second duration to decrease aliasing caused by reflections from the surface.

11. The system for reducing the auditory spatial aliasing of claim 10, wherein the plurality of anti-aliasing profiles comprises:
- a first anti-aliasing profile for when the tablet computer is docked with the dock;
- a second anti-aliasing profile for when the tablet computer is being held; and
- a third anti-aliasing profile for when the tablet computer is lying flat.

12. The system for reducing auditory spatial aliasing of claim 6, further comprising an inertial measurement unit (IMU), wherein the speakers that output audio from the first audio source and the second audio source vary based on an orientation determined using a measurement made by the IMU.

13. The system for reducing auditory spatial aliasing of claim 6, wherein the first audio source comprises a first digital signal processor (DSP) and the second audio source comprises a second DSP.

14. The system for reducing auditory spatial aliasing of claim 6, wherein the system is incorporated as part of a tablet display that is permanently attached with a stand configured to stand on a surface.

15. A method for reducing auditory spatial aliasing, the method comprising:

setting a first delay filter that delays output of a first same audio signal by a first duration to a speaker of a first set of multiple speakers of a device compared to a second speaker of the first set of multiple speakers;

setting a second delay filter that delays output of a second same audio signal by a second duration to a speaker of a second set of multiple speakers of the device compared to a second speaker of the second set of multiple speakers, wherein:

the first delay filter and the second delay filter setting decreases auditory spatial aliasing for a user; and outputting the first same audio signal using the first set of multiple speakers and the second same audio signal using the second set of multiple speakers.

16. The method of claim 15, further comprising:

determining an orientation of the device using a measurement from an inertial measurement unit (IMU) of the device.

17. The method of claim 16, further comprising:

assigning an anti-aliasing profile from a plurality of anti-aliasing profiles based at least in part of the orientation of the device, wherein the anti-aliasing profile defines the first duration and the second duration.

18. The method of claim 17, further comprising:

detecting a state change of the device; and in response to the state change, selecting a different anti-aliasing profile from the plurality of anti-aliasing profiles.

19. The method of claim 18, wherein the state change comprises the device being removed from a dock.

20. The method of claim 19, wherein the anti-aliasing profile decreases auditory aliasing caused by reflection of audio by a surface on which the dock is located.

* * * * *